United States Patent [19]

Murphy et al.

[11] 4,412,691
[45] Nov. 1, 1983

[54] DOOR MOUNTED SEAT BELT RETRACTOR

[75] Inventors: James E. Murphy, Royal Oak; Kenneth H. Reid, Mt. Clemens, both of Mich.

[73] Assignee: General Motors Corporation, Detroit, Mich.

[21] Appl. No.: 273,575

[22] Filed: Jun. 15, 1981

[51] Int. Cl.³ ............................................. B60R 21/10
[52] U.S. Cl. ............................ 280/803; 242/107.4 A; 297/478
[58] Field of Search ....................... 280/801, 803, 804; 242/107.4 A; 297/478, 479

[56] References Cited

U.S. PATENT DOCUMENTS

| 4,040,645 | 8/1977 | Giffen | 280/803 |
| 4,181,326 | 1/1980 | Hollowell et al. | 280/803 |
| 4,244,600 | 1/1981 | Takada | 280/803 |
| 4,264,089 | 4/1981 | Maekawa | 280/803 |

FOREIGN PATENT DOCUMENTS 2355562  5/1975  Fed. Rep. of Germany ...... 280/803

Primary Examiner—Richard A. Bertsch
Attorney, Agent, or Firm—Charles E. Leahy

[57] ABSTRACT

A seat belt retractor adapted for mounting on a vehicle door includes an inertia sensing pendulum for moving the lock bar into engagement with a belt reel to lock the reel against belt unwinding rotation. A feeler device, such as a plunger, is mounted on the door for sensing initial movement of the door away from the closed position. A flexible element, such as a chain, is connected to the pendulum and the feeler device. The flexible element has a normal slackened link when the door is closed so that the pendulum is free for movement to move the lock bar to the reel engaging position. Upon initial door opening movement, the plunger extends and tensions the flexible element so that the flexible element restrains the pendulum against movement from the normal position by an inertia stimulus induced by door opening movement.

2 Claims, 3 Drawing Figures

DOOR MOUNTED SEAT BELT RETRACTOR

The invention relates to a door mounted seat belt retractor and more particularly provides mechanism for blocking out the inertia sensing pendulum so that the retractor will not lock the belt during opening movement of the door.

BACKGROUND OF THE INVENTION

It is desirable to mount a seat belt retractor in a vehicle door so that the belt is automatically moved between an occupant access position and an occupant restraining position upon movement of the door between the open and closed positions. It is also desirable that such seat belt retractors employ a lock bar which is actuated by a pendulum so that the reel is locked against belt unwinding rotation in response to a sensed condition of vehicle deceleration.

A shortcoming of the aforedescribed door mounted pendulum actuated retractor is that a rapid movement of the door in the door opening direction can result in an acceleration condition which causes the pendulum to actuate the lock bar and lock the reel against belt unwinding.

Prior patents, such as Giffen et al U.S. Pat. No. 4,040,645, teach the provision of a mechanism which holds the lock bar in the unlocked condition when the door is being opened.

SUMMARY OF THE INVENTION

According to the present invention, an inertia sensing pendulum in a retractor is movable from a normal position by an inertia stimulus to move the lock bar into engagement with a belt reel and thereby lock the reel against belt unwinding rotation. A feeler device, such as a plunger, is mounted on the door for sensing movement of the door away from the closed position. A flexible element, preferably a chain, acts between the feeler device and the pendulum. The flexible element has a normal tensionless condition when the door is closed so that the pendulum is free for movement by an inertia stimulus to move the lock bar to the engaged position. The flexible element is tensioned by the feeler device in response to initial door movement from the closed position so that the flexible element restrains the pendulum against movement from the normal position by an inertia stimulus induced by door opening movement.

The object, feature and advantage of the invention resides in the provision of a flexible element which acts between a door frame feeler device and an inertia sensing pendulum and is tensioned upon initial door movement from the closed position to restrain the pendulum against movement by an inertia stimulus induced by opening movement of the door.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
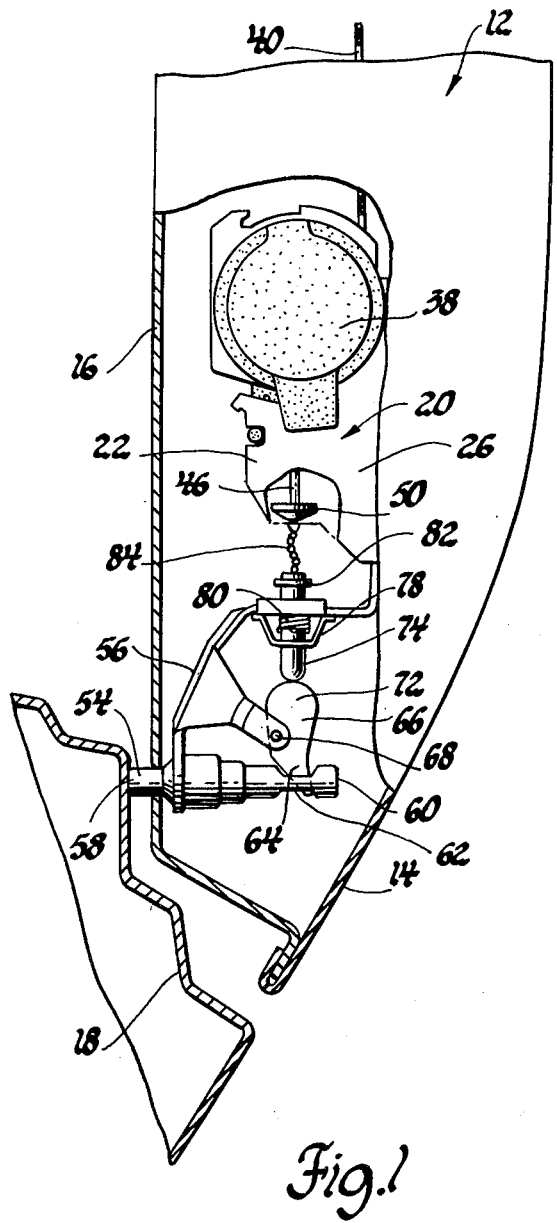
FIG. 1 is a sectional view through a vehicle body door showing a seat belt retractor according to the invention mounted within the door.

Referring to FIG. 1, there is shown a vehicle door 12 comprised of a door outer panel 14 and a door inner panel 16. The door 12 is conventionally pivotally mounted on a door frame defined in part by a rocker panel 18. A seat belt retractor generally indicated at 20 is mounted in the door 12.

Figure 2:
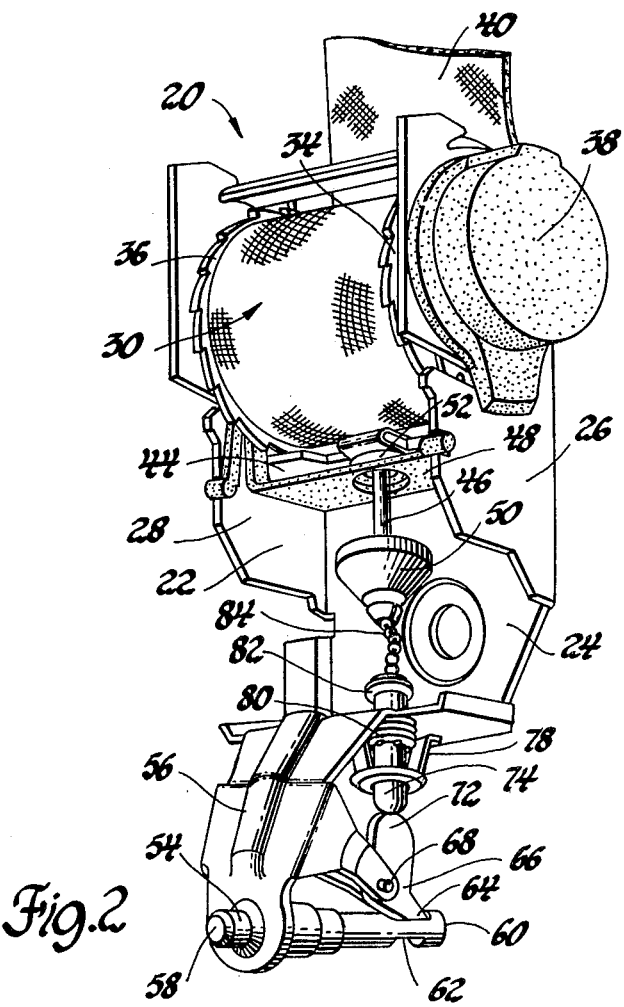
FIG. 2 is a perspective view of the shoulder belt retractor and showing a plunger retracted by engagement with the door frame so that a flexible chain attached to the pendulum is slackened to permit normal movement of the pendulum by an inertia stimulus to move the lock bar to the reel engaging position.

Referring to FIG. 2, it is seen that the retractor 20 includes a frame 22 having a base 24 and walls 26 and 28. A belt reel generally indicated at 30 includes a reel shaft, not shown, which extends through the mounting apertures of the frame walls 26 and 28 and a pair of ratchet plates 34 and 36 attached to the reel shaft. A windup spring, not shown, is mounted inside a housing 38 and urges rotation of the reel 30 in the direction to wind belt 40 upon the reel 30.

A lock bar 44 is pivotally mounted on the frame 22. An inertia sensing pendulum 46 is mounted on a pendulum support 48 and includes a pendulum weight 50. The lock bar 44 rests upon a head 52 of the pendulum 46. The onset of a vehicle deceleration condition of predetermined magnitude causes the pendulum 46 to move from the normal vertical depending position of FIG. 2 so that the pendulum head 52 pivots the lock bar 44 upwardly and the lock bar 44 engages with the ratchet plates 34 and 36 to lock the belt reel 30 against rotation in the belt unwinding direction.

A blockout mechanism is provided to restrain the pendulum 46 against movement from the normal vertical position of FIG. 2. As best seen in FIG. 2, a plunger 54 is mounted on a bracket 56 of the retractor frame 22 and includes an outer end 58 which projects through the door inner panel 16 and into contact with the rocker panel 18 as best seen in FIG. 1. The plunger 54 also includes an inner end 60 having a slot 62 which receives a lower end 64 of a link 66 mounted on the bracket 56 by a pivot pin 68. The link 66 also has an upper end 72 which is engaged by a plunger 74 captured by a support 78 and biased in the downward direction by a coil compression spring 80. The upper end 82 of the plunger 74 is attached to a flexible chain 84 which is in turn attached to the weight 50 of pendulum 46.

Referring to FIGS. 1 and 2, it will be understood that when the door is closed, the rocker panel 18 causes the plunger 54 to be retracted so that the link 66 retains the plunger 74 at its raised position of FIG. 2 against the bias of the coil compression spring 80. Accordingly, the chain 84 is held at a slackened tension-free length so that the pendulum 46 is free to move in response to onset of vehicle deceleration condition to move the lock bar 44 into engagement with the reel ratchet plates 34 and 36.

Figure 3:
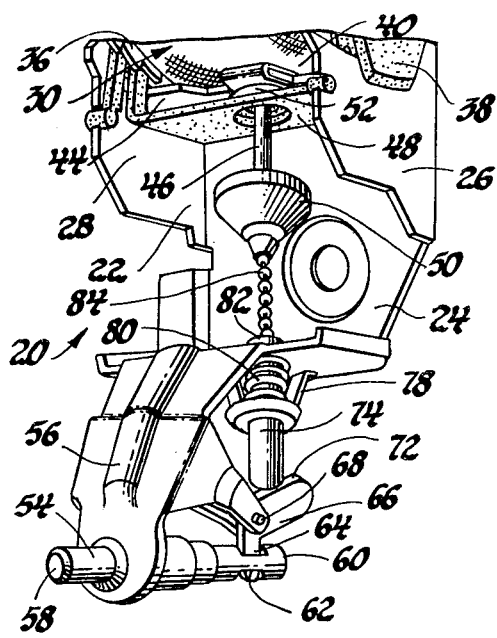
FIG. 3 is a view similar to FIG. 2 but showing the plunger extended upon initial movement of the door away from the closed position so that the flexible chain is tensioned and restrains the pendulum against movement induced by door acceleration so that the lock bar will not be moved to the reel engaging position.

Referring to FIG. 3, it is seen that initial opening movement of the door moves the retractor 20 away from the rocker panel 18 so that the plunger 54 is allowed to extend from the door 12. Accordingly, the coil compression spring 80 urges the plunger 74 downwardly as permitted by pivotal movement of the link 66 and the extension of the plunger 54. The downward movement of the plunger 74 tensions the chain 84 and accordingly restrains the pendulum 46 against movement from the normal vertical position. Accordingly, the accelerative forces imposed on the retractor 20 during opening movement of the door cannot move the pendulum away from the normal vertical position so that the lock bar 44 will not be moved into locking engagement with the reel ratchet plates 34 and 36.

When the door is closed, the plunger 54 is again depressed and in turn pivots the link 66 to its FIG. 2 position supporting the plunger 74 in the upward position against the bias of the coil compression spring 80. Chain 84 is thus restored to the slackened tension-free length so that the pendulum 46 is free to react to an inertia stimulus.

While the invention has been disclosed primarily in terms of the specific embodiment shown in the drawings, it is not intended to be limited thereto but rather only to the extent set forth in the appended claims. For example, the chain 84 could be any flexible element such as a cord, cable or strand of flexible material.

The embodiments of the invention in which an exclusive property or privilege is claimed are defined as follows:

1. A seat belt retractor adapted for mounting on a door hingedly mounted for movement between positions opening and closing a door opening defined by a door frame and comprising:
    a retractor frame mounted on the door and having a pendulum support means;
    a reel rotatably journaled on the retractor frame and having ratchet teeth thereon;
    a lock bar pivotally mounted on the retractor frame for movement from a normal disengaged position to a locking position engaged with the reel ratchet teeth to lock the reel against belt unwinding rotation;
    a pendulum having a head mounted on the pendulum support means of the retractor frame to engage the lock bar and an inertia weight movable from a normal position by an inertia stimulus to move the lock bar to the engaged position;
    feeler means mounted on the door for sensing movement of the door from the closed position; and
    a flexible element having one end attached to the feeler means and the other end attached to the inertia weight of the pendulum, said flexible element having a normal tensionless condition when the door is closed so that the pendulum is free for movement by in inertia stimulus to move the lock bar to the engaged position, said flexible element being tensioned by the feeler means in response to door movement from the closed position so that the flexible element restrains the pendulum against movement from the normal position by an inertia stimulus induced by door opening movement.

2. A seat belt retractor adapted for mounting on a door hingedly mounted for movement between positions opening and closing a door opening defined by a door frame and comprising:
    a retractor frame mounted on the door and having a pendulum support means;
    a reel rotatably journaled on the retractor frame and having ratchet teeth thereon;
    a pawl pivotally mounted on the retractor frame for movement from a normal disengaged position to a locking position engaged with the reel ratchet teeth to lock the reel against belt unwinding rotation;
    a pendulum having a head mounted on the pendulum support means of the retractor frame to engage the pawl and an inertia weight movable from a normal position by an inertia stimulus to move the pawl to the engaged position;
    a plunger movably mounted on the door for engagement with the door frame;
    spring means biasing the plunger to extend from the door upon opening movement of the door away from the door frame and permitting retraction of the plunger into the door upon plunger engagement with the door frame when the door is closed; and
    a flexible element having one end attached to the inertia weight of the pendulum and another end attached to the plunger, said flexible element having a normal tensionless condition when the door is closed and the plunger is retracted so that the pendulum is free for movement by an inertia stimulus to move the lock bar to the engaged position, said flexible element being tensioned by extension of the plunger in response to door movement from the closed position so that the flexible element is tensioned and restrains the pendulum against movement from the normal position by an inertia stimulus induced by door opening movement.

* * * * *